United States Patent [19]

Nussbaum

[11] 4,227,835

[45] Oct. 14, 1980

[54] APPARATUS FOR THE METERED SUPPLY OF POWDER TO A POWDER PROCESSING UNIT

[75] Inventor: Herbert Nussbaum, Geroldswil, Switzerland

[73] Assignee: Plasmainvent AG, Zug, Switzerland

[21] Appl. No.: 13,274

[22] Filed: Feb. 21, 1979

[30] Foreign Application Priority Data

Feb. 23, 1978 [DE] Fed. Rep. of Germany ....... 2807866

[51] Int. Cl.³ ............................................. B65G 53/48

[52] U.S. Cl. ...................................... 406/52; 222/636; 406/135

[58] Field of Search ..................... 406/52, 63, 68, 135, 406/126, 124; 222/636, 630

[56] References Cited

U.S. PATENT DOCUMENTS

| | | | |
|---|---|---|---|
| 2,912,282 | 11/1959 | Schult | 406/52 |
| 2,924,488 | 2/1960 | Lawyer | 406/52 |
| 3,201,001 | 8/1965 | Roberts et al. | 406/63 |
| 3,804,303 | 4/1974 | Fassauer | 406/124 X |
| 3,909,068 | 9/1975 | Coucher | 406/63 |

*Primary Examiner*—Robert B. Reeves
*Assistant Examiner*—Gene A. Church
*Attorney, Agent, or Firm*—Fitzpatrick, Cella, Harper & Scinto

[57] ABSTRACT

Powder is fed from a container into a continuous annular groove on a rotating metering plate. A doctor member ensures that the powder is correctly filled into the groove. The powder is then sucked out of the groove after the plate has rotated through a certain angle by a suction device which has a projection extending into the groove.

13 Claims, 7 Drawing Figures

APPARATUS FOR THE METERED SUPPLY OF POWDER TO A POWDER PROCESSING UNIT

FIELD OF THE INVENTION

The invention relates to apparatus for the metered supply of powder to a powder processing unit, in particular a plasma injection unit, with a rotating metering plate, a powder container disposed thereabove and having an outlet for depositing powder on the metering plate, and a powder removing unit operating under gas pressure for removing powder from the metering plate.

BACKGROUND OF THE INVENTION

In known apparatus of this kind the powder is shaken by a vibrator in a powder container constructed in the form of a cylinder, prior to deposition on the metering plate. From the metering plate, the powder is conveyed via a doctor member, which scrapes the powder off the plate, into a cone with a powder supply tube connected thereto, to the burner. The powder conveying medium is likewise gas. The unit is always under a relatively high pressure of approximately 3 bar.

Owing to the strong vibrations required, unmixing effects of the grain fraction are unavoidable, and due to accumulations of the powder, irregular quantities are thrown into the cone by the doctor member.

Another known apparatus for the metered supply of powder to a powder processing unit comprises a worm or a turbine wheel for metering. In this case the risk exists that the cavities of the worm or the cavities of the turbine wheel are not always filled perfectly, and high wear occurs. The filling conditions are therefore always changing, so that accurate reproducible metering is possible only with difficulty.

Finally, a disc having a number of holes at the periphery has become known for metering. The holes are filled with powder, and a gas jet then presses the powder out of the holes again. With this apparatus, too, perfectly reproducible metering and a uniform supply of powder to the powder processing unit cannot be obtained.

OBJECT OF THE INVENTION

The object of the invention is to provide apparatus of the kind described above which permits accurately adjustable metering for powders of different granulation and continuous uniform feeding of the metered powder to the power processing unit. It should be possible to deposit normal powder from 5 to 22 microns, 5 to 37 microns and 10 to 60 microns in a flowable manner without vibrations.

SUMMARY OF THE INVENTION

According to the invention, there is provided apparatus for the metered supply of powder to a powder processing unit, the apparatus comprising a rotatable metering plate, a circularly extending powder groove in the metering plate, a powder container located above the groove, an outlet from the powder container to the groove, a doctor member positioned at the outlet of the powder container, and a suction device, for removing powder from the metering plate, provided above the powder groove and extending into the powder groove.

The metered quantity can be controlled continuously by controlling a steplessly, preferably electronically controllable driving motor for the metering plate. An extremely high reproducibility of the metering is attained by accurate machining of the powder groove in the metering plate and the parts associated therewith, as well as by accurately controlled rotation of the metering plate. Owing to the gas pressure in the region of the suction device extending into the powder groove, a gas flow is produced which sucks the powder continuously out of the powder groove without pulsations of any kind.

Advantageously the rotating metering plate is urged against the doctor member and the suction device in a resilient manner. Thereby perfect deposition of the powder in the powder groove and removal from the powder groove is assisted.

Preferably the metering plate is arranged in a stationary casing which surrounds it with only a small clearance, the gas which serves for building up the gas pressure is supplied thereto. In this case the doctor member and the suction device are advantageously supported by the stationary casing.

In order to be able to observe even visually the operation of the metering device, the upper portion of the stationary casing is preferably of transparent material, in particular synthetic resin material, such as acrylic glass or the like.

Advantageously the powder groove has a small depth and a large width. Thereby the outlet opening of the doctor member also may have a large diameter, whereby a good outflow of the powder and accurate metering is ensured.

Conveniently the doctor member is supported on both sides of the powder groove, and its trailing end, relatively to the metering plate moving therebelow, comprises a chamfer in the lower surface in the region of the outlet opening. The chamfer which exerts a funnel effect upon the previously deposited powder serves for assisting the clean deposition of the powder in the powder groove.

Furthermore, the leading end, relatively to the metering plate moving therebelow, of the doctor member advantageously has a concave end face which extends perpendicular to the plane of the metering plate. The end face constructed in this manner serves for directing back into the powder groove residual powder which may have fallen outside the powder groove during deposition, and powder which under certain circumstances may not have been sucked away. The doctor member consists advantageously of polytetrafluorethylene and is pressed on to the metering plate, but not into the powder groove.

The suction device is preferably so constructed that it is supported on both sides of the powder groove and comprises behind the suction bore a crescent-shaped projection which extends into the powder groove as far as the bottom surface thereof and the concave end face of which is directed towards the suction bore. The crescent-shaped projection has the same depth as the powder groove and assists the sucking away of the powder in the bore located in front of it. By means of this projection a pulsatory suction removal is avoided. Such a pulsatory action would be disadvantageous for plasma injection.

A further measure for improved uniform deposition of the powder on the metering plate resides in that a further funnel-shaped powder container is provided within the powder container, and a conically shaped deflector member is arranged at the outlet end thereof at a constant spacing from the outlet end of the further powder container. In this case the spacing between the deflector member and the further powder container depends upon the powder granulation and amounts to from 1 to 10 mm and is preferably adjustable by adjustment of the deflector member.

Due to the presence of the roof-shaped deflector member under the further powder container, the gas pressure in the powder can flow away laterally parallel to the roof surface of the deflector member and has no longer an effect in the region of the doctor member. Exactly the same conditions in respect of the powder pressure upon the metering plate then always occur in the lower effective metering region.

When powders which flow badly or not at all, particularly very fine powders, all of which can be conveyed with difficulty only, are to be manipulated, it is advantageous to provide a tubular fluidiser which extends centrally into the lower ends of the first and the second powder container and which has fine bores in the lower and in the upper region through which has is introduced into the powder, advantageously at a pressure of from 0.2 to 2 bar.

Furthermore fine vibratory wires may be attached in the lower region of the fluidiser extending into the first powder container and may be set into swinging motion by means of a vibrator. The vibratory wires conveniently have a diameter of from 0.3 to 1 mm. The intensity may be adjusted in a stepless manner depending upon requirements; but it is such that it can never lead to unmixing of the grain fraction.

In the case of a specific demand for a special powder, a drive for rotating the vibratory wires about the axis of the powder container may also be provided. In this case it is sufficient to provide the fluidiser in the lower region only.

In order to maintain or equalise a predetermined pressure of from 0.3 to 3.5 bar, preferably 0.5 to 3 bar in the powder container or containers, it is advantageous to provide a gas pressure compensating tube in the region of the powder containers.

Finally the entire metering unit is advantageously connected to the driving motor for the metering plate in a simply releasable manner. Thereby the entire unit may be removed from the casing, so that any residual powder can be discharged very quickly in a problem-free manner through the lid located on the powder container. In this way a rapid and simple change of powder is possible.

A key-and-socket coupling is advantageously provided as connection between the metering unit and the driving motor.

Further features and advantages of the invention will become apparent from the following description which is to be read in conjunction with the accompanying drawings.

DETAILED DESCRIPTION OF THE EMBODIMENTS

Figure 1:
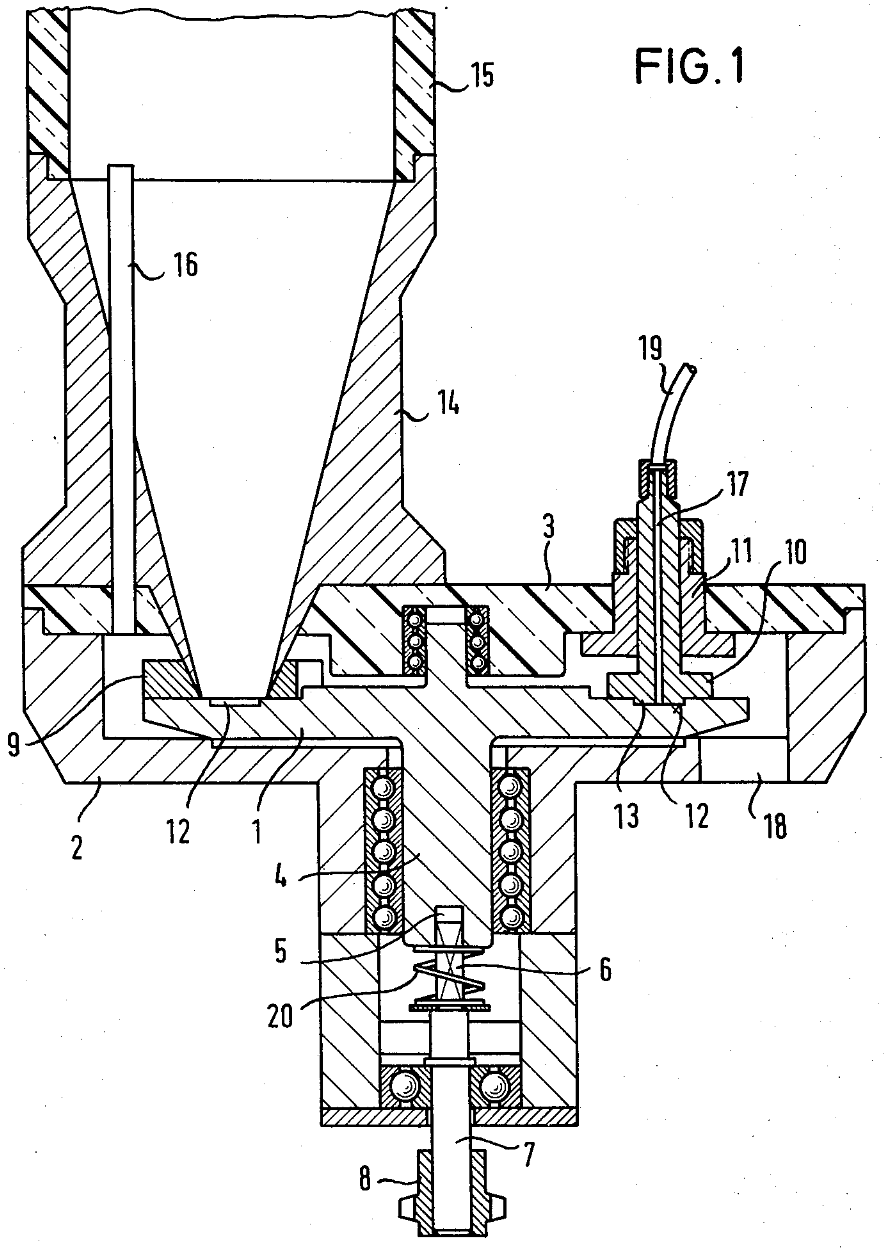
FIG. 1 is a diagrammatic illustration of a powder supply and metering apparatus, in cross-section.

FIG. 1 illustrates an apparatus according to the invention for the metered supply of powder to a powder processing unit. A rotating metering plate 1 is mounted in a gas-tight manner in a stationary casing which comprises a lower portion 2 and an upper portion 3 consisting preferably of acrylic glass. A lower shaft stub 4 of the metering plate 1 is provided with a polygonal recess 5 in which is located the polygonal projection 6 of a drive shaft 7 in a releasable manner. The polygonal recess 5 and the polygonal projection 6 form a key-and-socket coupling for releasably connecting the drive shaft 7 to the metering plate 1 and thus to the entire metering unit. At the lower end of the drive shaft 7 a driving pinion 8 may be seen which is in direct connection with a driving motor (not shown).

A compression spring 20 between the drive shaft 7 and the metering plate 1 ensures that the metering plate 1 is pressed resiliently in the direction of the upper portion 3 of the stationary casing. Thereby the metering plate is urged against a doctor member 9 and a suction device 10 which is turn is located in a holder 11 in the upper portion 3.

The metering plate 1 is provided with a powder groove 12 of shallow depth, for example 1.2 mm, and high surface quality and is in the form of an annular groove. The doctor member 9 and the suction device 10 are supported on both sides of the powder groove 12 on the metering plate. The suction device 10 comprises additionally a projection 13 which extends into the powder groove and fills the same as far as the bottom.

A powder container 15 is provided above the doctor member 9 and above an outflow funnel 14 connected thereto, and consists preferably of acrylic glass. A gas pressure compensating tube 16 connects the interior of the casing 2, 3 to the interior of the powder container 15. The gas pressure in the powder container 15 and in the interior of the stationary casing with the portions 2 and 3 amounts to from 0.3 bar to 3.5 bar, preferably 0.5 bar to 3 bar. The bore in the doctor member 9 has a dimension such that normal powder from 5 to 22 microns, 5 to 37 microns and 10 to 60 microns can be deposited in a flowable manner without vibrations and thereby enormously high metering accuracies may be obucmned.

The powder deposited in the powder groove 12 is delivered by the suction device 10 through a suction bore 17 in a continuous manner and without pulsations in consequence of the gas pressure fed through a gas inlet 18 and is guided further through a tube 19 attached to the suction device 10, to the powder processing unit, for example a plasma injection burner.

Figure 2:
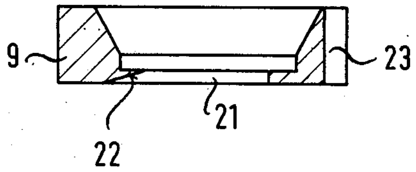
FIG. 2 is a longitudinal section through the doctor member of the unit in FIG. 1, in section on the line II—II in FIG. 3.

FIG. 2 illustrates the doctor member 9 in longitudinal section. A chamfer 22 may be seen on the underside of the doctor member 9 at the rear end of the passage bore 21. This chamfer contributes to the clean deposition of the powder into the powder groove. The doctor member 9 rests on the metering plate 1 on both sides of the powder groove, but does not enter into the powder groove 12.

Figure 3:
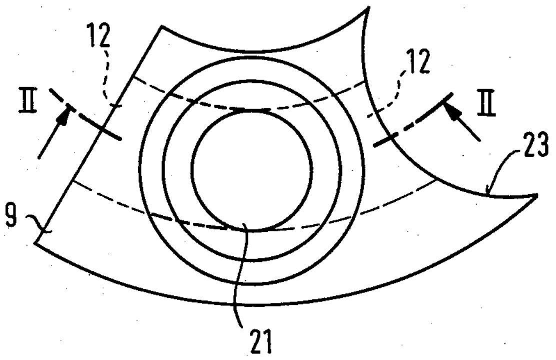
FIG. 3 is a view from above on the doctor member according to FIG. 2.

FIG. 3 illustrates a view from above on to the doctor member 9. It is clearly visible in this view from above that the front end of the doctor member 9 is provided with a concave end face 23 which extends parallel to the plane of the metering plate. This concave end face is intended to move any residual powder which may be present on the metering plate 1 back again into the powder groove 12; such powder may have fallen outside the powder groove 12 during filling, or may be powder which had not been sucked away. The doctor member 9 consists advantageously of polytetrafluorethylene.

Figure 4:
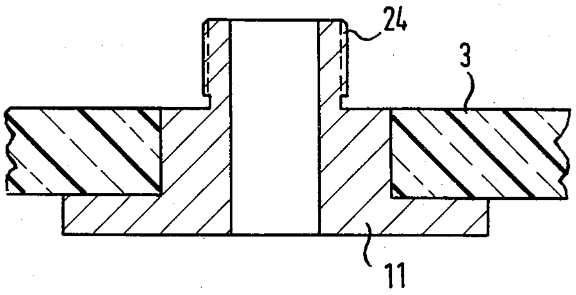
FIG. 4 shows a holder for the suction device of the unit in FIG. 1, in cross-section.

FIG. 4 illustrates the holder 11 for the suction device 10 in cross-section. A projection 24 with an external screw-thread may be seen on the upper surface, for receiving a nut which serves the purpose of fixing together the holder 11, the suction device 10 and the portion 3 of the stationary casing.

Figure 5:
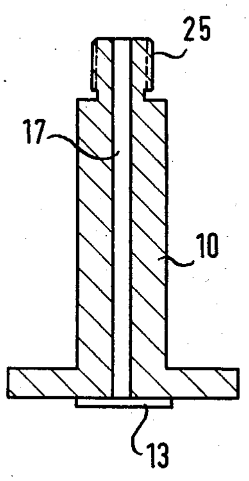
FIG. 5 shows a suction device for the unit according to FIG. 1, in cross-section taken on the line V—V in FIG. 6.

FIG. 5 illustrates in cross-section the suction device 10. The projection 13 which extends into, and substantially fills, the cross-section of the powder groove 12 may be clearly seen at the lower end. At the upper end a screwthread 25 is provided for attaching the tube 19 for the discharge of powder.

Figure 6:
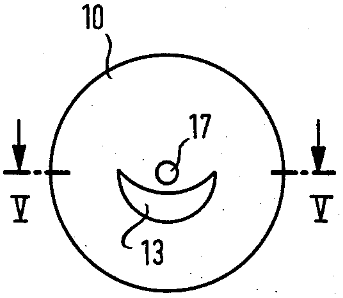
FIG. 6 is a view from below of the suction device according to FIG. 5.

FIG. 6 illustrates a view from below of the suction device 10. It may be seen therein that the projection 13 protruding into the powder groove 12 is of crescent-shaped construction and is arranged behind the suction bore 17 with its concave end face directed towards the suction bore 17. Owing to the overpressure in the powder container 15 the powder is sucked away continuously through the suction bore 17. The crescent-shaped projection 13 behind the suction bore 17 has the same depth as the powder groove 12 and ensures that a continuous suction action is produced, and not a pulse-like suction action.

Figure 7:
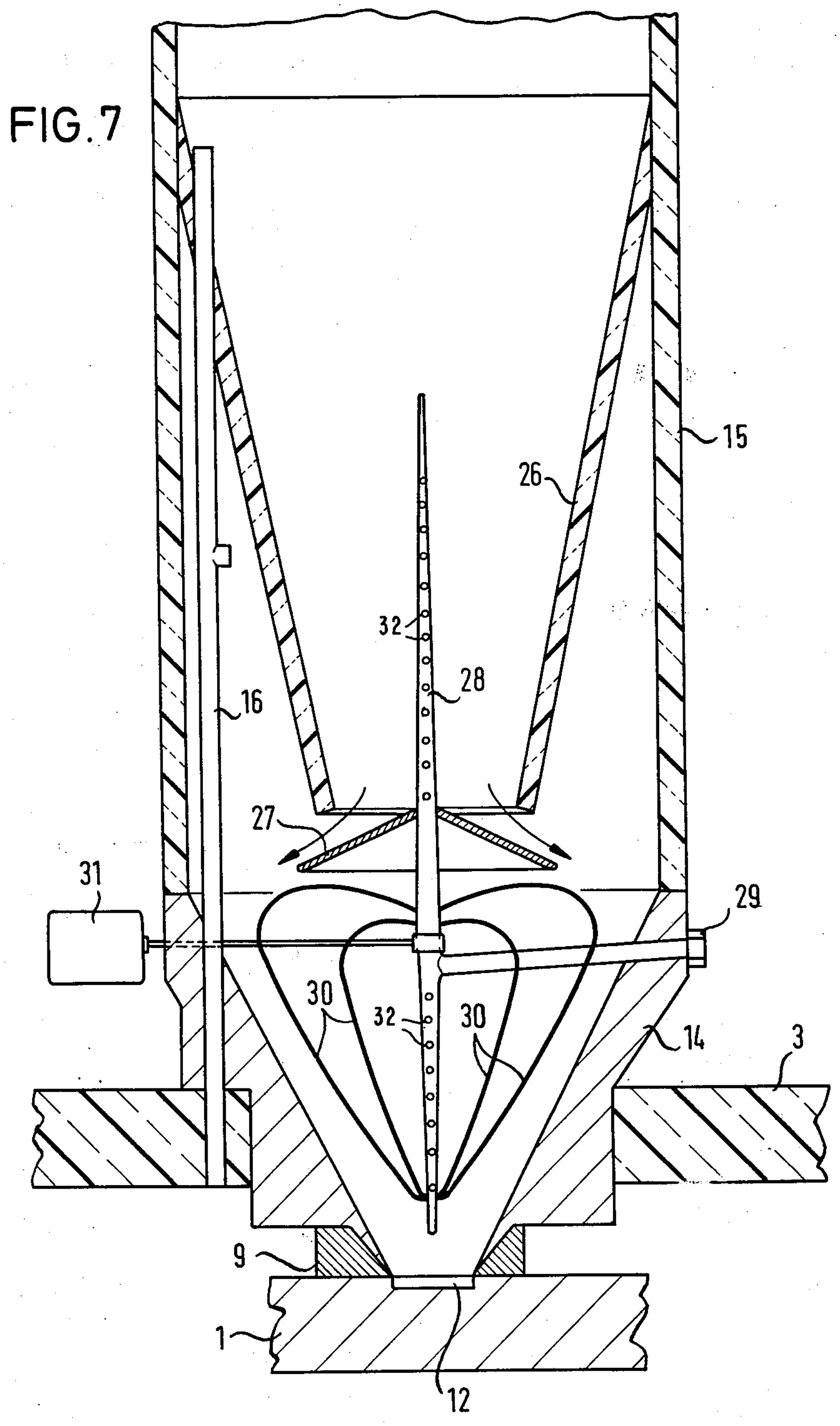
FIG. 7 is a diagrammatic illustration of part of a second embodiment of the apparatus, in cross-section.

A further embodiment of the powder container as far as the doctor member is illustrated in FIG. 7. In this embodiment a further funnel-shaped powder container 26 is provided within the first powder container 15 and terminates at the lower end above the discharge funnel 14. A roof-shaped or conically shaped deflector member 27 is disposed centrally below the lower end of the further powder container, at a spacing of from 1 to 10 mm therefrom, and forms an annular gap of constant size. The pressure present in the powder container 26 can flow away laterally through this gap in the direction of the arrows shown, so that in the region of the doctor member 9 the powder always exerts the same pressure onto the powder groove 12. The gas pressure compensating tube 16 also ensures pressure equalisation in the powder containers 15 and 26.

In the case of the metering unit according to FIG. 7, a tubular fluidiser 28 is additionally provided. Such a fluidiser is necessary for very fine powders and for powders which flow only with difficulty or not at all; all of these can be conveyed only with difficulty.

The tubular fluidiser 28 projects into the lower ends of the first powder container 15 and/or discharge container 14, and the second powder container 26. In a lower and in an upper region, it has fine bores through which a gas is introduced into the powder at a pressure of from 0.2 bar to 3 bar. This gas is fed to the fluidiser 28 through a gas inlet 29.

Fine vibratory wires 30 with a diameter of from 0.3 mm to 1 mm are attached to the part of the fluidiser 28 which extends into the first powder container 15 and/or the discharge container 14. These vibratory wires 30 which are arranged in the manner of an egg whisk are set in swing motion by means of a vibrator 31. The vibrator 31 is steplessly adjustable in accordance with requirements. Because of the second powder container 26 and the conically shaped deflector member 27, always exactly the same pressure conditions prevail in the lower effective metering region at the doctor member 9 for the fluidisation and vibration. It is possible thereby to accurately meter powder which would not otherwise be sufficiently fluid.

Also a drive not illustrated in the drawing may be provided with the aid of which the vibratory wires can be rotated about the axis of the powder containers 15 and 26 at speeds of from 5 to 300 revolutions per minute. In this case the upper part of the fluidiser 28 which protrudes into the powder container 26 may be omitted. The drive comprises advantageously a bar motor with associated coupling attached in the lid (not illustrated) of the powder container 15.

I claim:

1. Apparatus for the metered supply of powder to a powder unit, the apparatus comprising:
- a rotatable metering plate,
- a circularly extending powder groove in the metering plate,
- a powder container located above the groove,
- an outlet from the powder container to the groove, and
- a suction device, for removing powder from the metering plate, provided above the powder groove and extending into the powder groove, wherein
- a doctor member is positioned around the outlet of the powder container, is supported on both sides of the powder groove and its rear end, and has a chamfer in the lower surface in the region of the container outlet,
- the suction device being supported on both sides of the powder groove and comprising a suction bore and a crescent-shaped projection behind the suction bore, said projection extending into the powder groove as far as the bottom surface thereof, the concave end face of said crescent-shaped projection directed towards the suction bore, and
- resilient means for biasing the metering plate against the doctor member and the suction device.

2. The apparatus of claim 1, wherein a stationary casing surrounds the metering plate with a small clearance, and gas supplying means are provided for building up gas pressure in the casing.

3. The apparatus of claim 2, wherein the doctor member and the suction device are supported by the stationary casing.

4. The apparatus of claim 2, characterized in that the stationary casing has an upper portion which consists of a transparent material, such as a synthetic resin material.

5. The apparatus of claim 1, wherein the forward end of the doctor member has a concave end face which extends perpendicular to the plane of the metering plate.

6. The apparatus of claim 1, including a further funnel-shaped powder container provided within the powder container, said further container having an outlet end and a conically-shaped deflector member arranged at a constant spacing from the outlet end to define a gap through which powder can pass, wherein the spacing between the deflector member and the outlet end of the further powder container amounts to from 1 mm. to 10 mm. and wherein the deflector member is adjustable as to its spacing from the outlet end of the further powder container in accordance with the powder processed.

7. The apparatus of claim 6, including a tubular fluidizer which extends centrally into the lower ends of the powder containers and is provided with fine bores in the lower and the upper region through which gas is introduced into the powder containers.

8. The apparatus of claim 7, including means for introducing gas into the powder through said tubular fluidizer at a pressure of from 0.2 to 2 bar.

9. The apparatus of claim 8, wherein fine vibratory wires are attached to the tubular fluidizer in the lower region thereof which extends into the first-mentioned powder container and are connected to a vibrator which sets them into swinging motion, the vibratory wires having diameters of from 0.3 to 1.5 mm.

10. The apparatus of claim 8, including a drive for rotating the vibratory wires about the axis of the powder containers.

11. The apparatus of claim 3, including a gas pressure compensation tube for allowing the gas pressure in the powder container to equalize with the pressure in the stationary casing.

12. The apparatus of claim 1, wherein a driving motor for the metering plate is connected to the apparatus in a simply releasable manner by a key-and-socket coupling.

13. Apparatus for the metered supply of powder to a powder processing unit, the apparatus comprising:

a rotatable metering plate, a circularly extending powder groove in the metering plate, a first powder container located above the groove, a second powder container within the first powder container, an outlet from the second powder container, a deflector member spaced from said outlet to define a gap through which powder can flow from the second to the first powder container, an outlet from the first powder container to the groove, a doctor member positioned around the outlet of the powder container and being resiliently supported on both sides of the powder groove, and a suction device, for removing powder from the metering plate, provided above the powder groove, extending into the groove at a position angularly spaced from the doctor member around the circumference of the groove, and being resiliently supported on both sides of the powder groove.

* * * * *